May 15, 1945. H. M. EVJEN 2,375,775
ELECTRICAL PROSPECTING SYSTEM
Filed Feb. 25, 1943 2 Sheets-Sheet 1
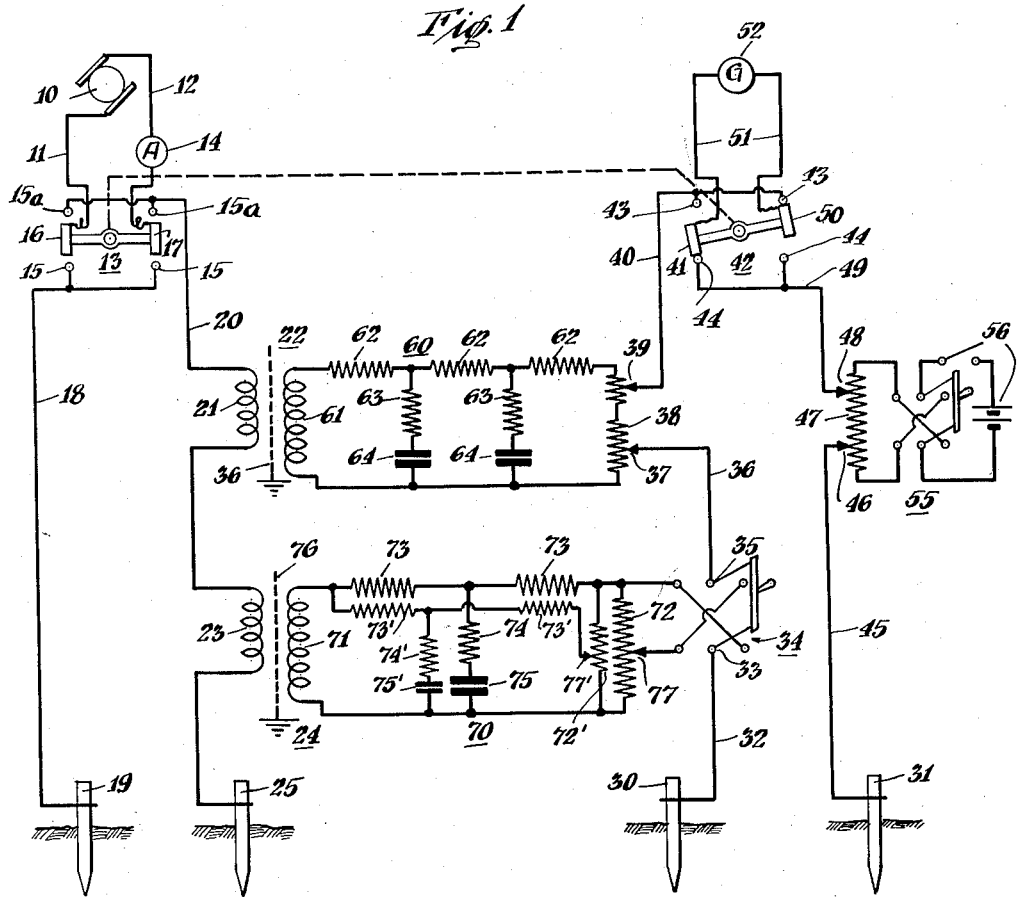
Fig. 1
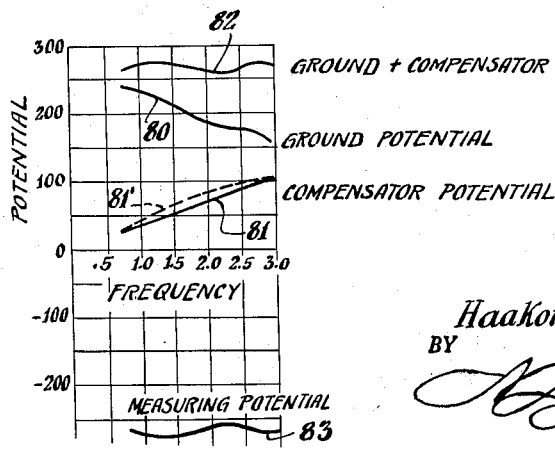
Fig. 2
INVENTOR.
Haakon M. Evjen
BY
ATTORNEY Patented May 15, 1945

2,375,775

UNITED STATES PATENT OFFICE 2,375,775

ELECTRICAL PROSPECTING SYSTEM

Haakon M. Evjen, Houston, Tex., assignor to Nordel Corporation, Houston, Tex., a corporation of Delaware Application February 25, 1943, Serial No. 477,015

7 Claims. (Cl. 175—182)

This invention relates to systems for making geophysical explorations and more particularly to systems of the general type disclosed in Evjen Patent 2,294,395, dated Sept. 1, 1942, wherein a current having a controlled low frequency of the order of from one-half cycle to twenty cycles per second is passed through the earth between spaced electrodes and the induced potential is picked up by a pair of potential electrodes located within the field of influence of the earth current, and is balanced against a measuring potential derived from the earth current circuit. A direct current source is utilized for energizing the earth current circuit and a direct current null balance measuring instrument is utilized for indicating the picked-up potential, the earth current circuit and the picked-up potential being connected to the direct current source and the direct current measuring instrument respectively by synchronized reversing switches operated at controlled frequencies.

In operating a system of this type, a plurality of readings are taken at each location at different low frequencies and the results are plotted in the form of a picked-up potential-frequency curve. In a homogeneous medium this curve would be smooth, steadily decreasing, or steadily increasing with frequency, depending on the electrode arrangement. In a non-homogeneous medium, however, anomalous irregularities or ripples appear on the curve which can be interpreted to show the nature and the location of the various strata.

The above mentioned change in the picked-up potential in a homogeneous medium is due to normal changes in the electrical parameters of the earth current circuit with frequency, such, for example, as the change in the inductive reactance of the earth current circuit with frequency. With the electrode configuration commonly used, this effect produces a considerable drop in the picked-up potential as the frequency is increased. Hence the curve referred to above will slope rather steeply.

Inasmuch as these variations with frequency are usually greater than the anomalous variations which produce the ripples in the characteristic curve, the former tend to mask the ripples and, in any event, increase the difficulty of analyzing the reading. It is accordingly an object of the present invention to provide a system of the above type in which the regular variations due to the normal variations of the earth current parameters are eliminated and the characteristic curve is restored to a substantially horizontal position where the small ripples may be readily observed.

This application is a continuation in part of my co-pending application Ser. No. 425,991, filed Jan. 8, 1942, now Patent No. 2,342,626, dated Feb. 29, 1944.

A feature of the present invention resides in the use of a compensator circuit, interconnecting the earth current circuit and the potential pick-up circuit and having characteristics such that the above mentioned slope is rectified, and the readings, except for the small anomalous variations, are substantially independent of frequency.

Another feature resides in the provision of coupling circuits which are adapted to effect measurements of the picked-up potential during zero earth current intervals so as to eliminate the masking effect of the comparatively large potential of the earth current circuit and to minimize intercircuit leakage.

Various other objects and advantages of the invention will be apparent as the nature of the invention is more fully disclosed.

The invention will be better understood by referring to the following description, taken in connection with the accompanying drawings in which a specific embodiment thereof has been set forth for purposes of illustration.

In the drawings,

Fig. 1 is a diagrammatic representation of a geophysical prospecting system embodying the present invention;

Fig. 2 is a series of curves illustrating the operation of the system shown in Fig. 1

Figure 3:
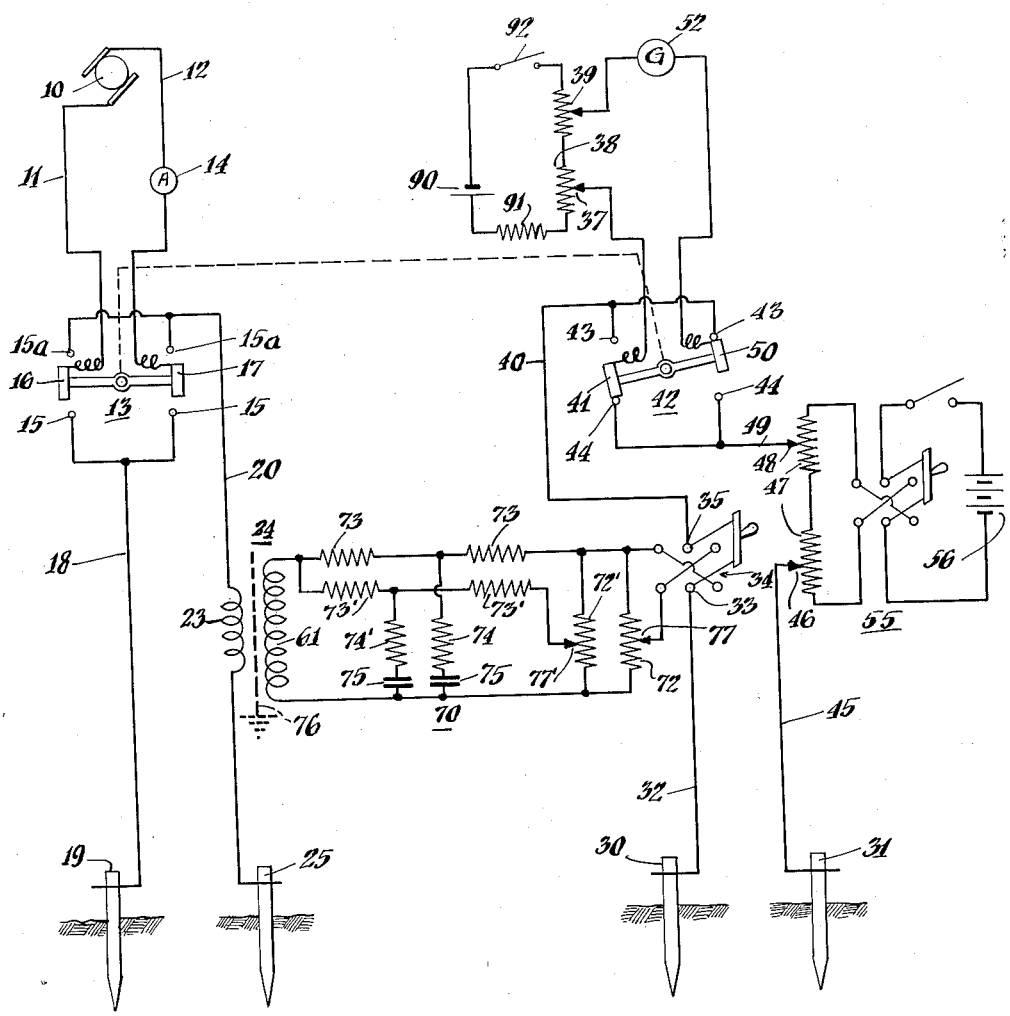
Fig. 3 is a diagrammatic representation of another embodiment of the invention.

In the following description, certain specific terms have been used for convenience in referring to various details of the invention. It is to be understood, however, that these terms are to be given as broad an interpretation as the state of the art will permit.

Referring to the drawings more in detail, a source 10 of direct current is connected by means of lines 11 and 12 to the reversing contacts 16 and 17 respectively of a motor driven reversing switch 13 which may be of any suitable type, for example, of the type shown in the Evjen Patent 2,314,874 dated March 30, 1943, which shows a switch adapted to reverse the circuit connections at a predetermined frequency and having an adjustable gap or clearance to control the timing of reversal, the current intervals and the gap intervals. An ammeter 14 is shown as connected in the line 12 for purposes of regulation and control.

The reversing switch 13 is provided with a pair of stationary contacts 15 connected by a line 18 to an earth current electrode 19, and with a pair of stationary contacts 15a connected by a line 20 to the primary 21 of an air core transformer 22 and to the primary 23 of an air core transformer 24 and thence to a second earth current electrode 25. The primaries 21 and 23 are shown as connected in series with the earth current circuit. They may, however, be connected in parallel or may be provided with shunt resistors. In any event, the primaries carry a current which is proportional to the total earth current.

The potential pick-up circuit comprises a pair of pick-up electrodes 30 and 31 which are located within the field of influence of the earth current. The pick-up electrode 30 is connected by a line 32 to a reversing contact 33 of a manual reversing switch 34. The second reversing contact 35 of the reversing switch 34 is connected by a line 36 to an adjustable contact 37 of a potentiometer 38. The second adjustable contact 39 of the potentiometer 38 is connected by a line 40 to stationary contacts 43 of a motor driven reversing switch 42 which is similar to the switch 13.

The potential pick-up electrode 31 is connected by a line 45 to an adjustable contact 46 of a voltage divider resistance 47. A second adjustable contact 48 of the voltage divider resistance 47 is connected by a line 49 to stationary contacts 44 of the reversing switch 42. The reversing switch 42 is provided with reversing contacts 41 and 50 which are connected by lines 51 across a direct current galvanometer 52. The reversing switches 13 and 42 are connected to be operated in unison at controlled frequencies and in controlled phase relationships by suitable means not shown. The contacts may be individually adjusted to open and close at selected phase angles.

The voltage divider 47 is connected through a manual reversing switch 55 across a source of potential, shown as a battery 56.

For passing through the potentiometer 38 a current which is proportional to the current flowing in the earth circuit, a coupling circuit is provided which comprises the transformer 22 and a filter network 60. The secondary 61 of the transformer 22 is connected through the filter network 60 across the potentiometer 38. The filter network 60 is of the type which compensates for any frequency variation characteristics of the transformer 22 and causes the current through the potentiometer 38 to be independent of frequency in a chosen frequency range. If, for example, the transformer 22 possesses a rising frequency curve, that is, produces an increasing amount of secondary current as the frequency is increased, then the filter network 60 will have a correspondingly falling frequency curve such that the resultant characteristic of the coupling circuit may be represented by a horizontal line. Hence the potential drop across the potentiometer always bears the same relation to the earth current at all operating frequencies within the selected range. In the embodiment shown, the filter 60 is of the low pass type having series resistances 62 and shunt resistances 63 and condensers 64. It is to be understood that these elements may be initially adjusted or selected as required to obtain the above mentioned characteristics.

The compensator circuit, for compensating for the variations in picked-up potential with frequency produced by the normal variations of the earth current parameters, comprises the transformer 24 and a filter network 70 which is connected to the secondary 71 of the transformer 24. The filter network 70 feeds into a potentiometer 72, an adjustable portion of which is connected across the reversing switch 34 by means of an adjustable contact 77. The filter network 70 has a frequency characteristic which compensates for the frequency characteristics introduced in the system by the normal variations in the parameters of the earth current circuit as above mentioned. Thus the current passed through the filter network 70 to the potentiometer 72 may increase or decrease with frequency according to the characteristics desired. In the embodiment shown, the filter network 70 is of the double T type, one branch comprising series ressitances 73, a shunt resistance 74, condenser 75, and potentiometer 72; the other branch comprising series resistances 73', shunt resistance 74', condenser 75', and shunt resistance 72' connected across the potentiometer 72 and provided with an adjustable contact 77'. These elements are of course initially adjusted or selected so as to obtain the desired operating characteristics. The resistors 73' are much larger than the resistors 73 because the effect to be compensated for by the branch containing the former is second order compared to that compensated for by the branch containing the latter resistors.

The transformers 22 and 24 are of the air core, shielded primary type, the primary being electrostatically shielded from the secondary by means of a grounded shield 76, and are designed to operate at extremely low frequencies. The shielded primaries eliminate any direct path between the earth current circuit and the potential pick-up circuit other than through the ground itself.

As a specific example the resistors 73 may have a value of 20,000 ohms each, the resistors 73' a value of 100,000 ohms, the resistors 74 and 74' a value of 50,000 ohms, the resistors 77 and 77' a value of 150 ohms, condensers 75 and 75' a value of 8 mfd., the primary 23 a resistance of 1.3 ohms and the secondary 71 a resistance of 3000 ohms.

*Operation*

In the operation of this system a current is passed through the earth between the electrodes 19 and 25. This current has a definite value and frequency, the value being dependent upon the source 10 and the resistance of the earth current circuit, and the frequency being dependent upon the frequency of operation of the reversing switch 13. This current is in the form of a flat-topped wave which, at each reversal, produces a surge which charges the parallel condensers of the filter networks 60 and 70, the charge gradually leaking off through the potentiometers 38 and 72 respectively in the intervals between successive charges.

The earth potential, picked up by the electrodes 30 and 31, which has a frequency corresponding to the frequency of the earth current, is rectified by means of the reversing switch 42, which is operated in unison with and at the same frequency as the reversing switch 13, so as to impress a uni-directional potential across the galvanometer 52.

The earth potential circuit includes the portion of the potentiometer 38 between the contacts 37 and 39. The potential between the contacts 37 and 39 is applied in such a way as to oppose the picked-up potential and is adjusted by means of the contacts 37 and 39 so as to produce a zero reading on the galvanometer 52 when a balance has been obtained. At this point of zero reading no current flows in the potential circuit. Consequently, the effect of line resistance, contact resistance and the like are eliminated.

Due to the normal variations of the earth circuit the ground potential may vary with frequency as indicated by the sloping curve 80 in Fig. 2 in which the potential is plotted as a function of the frequency in arbitrary units. It is to be noted that the curve 80 indicates a picked-up potential which decreases with frequency. In some instances it may increase with frequency depending upon the electrode arrangement and the earth's characteristics in the locality being measured. The potentiometer 72 of the compensating circuit is caused to introduce a potential into the potential pick-up circuit which compensates for this sloping characteristic of the curve 80. Such a potential is indicated by the curve 81 in Fig. 2 and it is noted that the filter network 70 of the compensator is caused to pass a current which increases with frequency in a manner such that the sum of the potentials represented by curves 80 and 81 represents a substantially horizontal curve as indicated at 82.

The potentiometer 72 may be adjusted so that the correct reading is obtained at the highest frequency and at the lowest frequency to be used. The output potential is then of the correct slope but may have an intermediate sag or bulge as indicated by the curve 81'. This is corrected by adjustment of the contact 77' at a selected intermediate frequency so as to obtain a substantially straight output potential curve as indicated by the curve 81. The compensator potential 81 added to the ground potential 80 produces a curve 82 having a substantially horizontal characteristic. Ordinarily the contact 77' need be adjusted only once at each locality whereas the slide 77 is adjusted at each station. The adjustments remain fixed during the group of measurements at each station.

Any residual earth current which would tend to produce a fluctuation in the galvanometer 52 is balanced out by suitable adjustment of the potentiometer 47 so as to eliminate any fluctuation of the pointer at the frequency of operation of the reversing switches 13 and 42. Continual readjustment of potentiometer 47 is made during a measurement whenever swinging of galvanometer 52 indicates that the potential due to naturally occurring earth currents is unbalanced.

After the above adjustments any variations which are obtained during the measurements are indicative of the characteristics of the earth's strata. Such variations are observed by setting the potentiometer 38 so as to introduce a measuring potential 83 (Fig. 2) which is equal and opposite to the potential curve 82 and produces a null balance at the galvanometer 52. The variations in setting of the potentiometer 38 may be plotted against frequency to produce the curve 83 above referred to.

The network 70 may be designed to pass either an increasing or a decreasing amount of current through the potentiometer 72 as the frequency of the earth current increases. The potential so produced may be added to or subtracted from the picked-up potential by means of the reversing switch 34. The particular position of the switch depends upon the electrode arrangement, the nature of the ground and various other factors.

In accordance with the present invention, the imaginary component of the ground potential is used for measurement purposes. This component is 90° out of phase with the earth current and the adjustments are made so that the measurements are made during zero earth current intervals.

For this purpose, the reversing switch 13 may be adjusted for a 120° current gap and a 60° current supply interval during each half cycle, and the reversing switch 42 may be adjusted for 120° potential gap and a 60° pick-up interval during each half cycle. The two switches, however, are set to operate alternately, or 90 electrical degrees out of phase so that the switch 13 is closed while the switch 42 is open and vice versa. In this way the potential pick-up circuit is closed for measuring purposes only during the zero current periods and the imaginary component of the earth potential is utilized for measurement. The switch 42 may be adjusted to short circuit the galvanometer 52 during potential gap intervals if desired. For example, contacts 43 may be adjusted to maintain contact with 41 and 50 as long as current is flowing through electrodes 19 and 25. The nature of the coupling circuits 22, 60 and 24, 70 is such that the output potentials applied to potentiometers 38 and 72 include components which are out of phase with the input earth current flowing through transformers 22 and 24 and electrodes 19 and 25.

The 90° out of phase or imaginary component of this out of phase output potential applied to potentiometers 38 and 72 is therefore available for comparison with the picked-up potential. By adjustment of the reversing switch 42 to apply only the imaginary component of the picked-up potential to the measuring potentiometers 38 and 72, the large in-phase picked-up potential is eliminated from the measuring circuit, and only the small imaginary picked-up potential component, on which the anomalous earth changes have relatively greater effect, is utilized.

This invention materially improves the quality of data obtainable. The unsignificant changes in potential are eliminated while the anomalous changes due to geologic structure are obtained directly from the position of the contacts 37 and 39.

Compensation also eliminates the errors which would otherwise be introduced due to variations in frequency while the readings are being taken. Without compensation it would be necessary to maintain a constant frequency to a high degree of precision while making each measurement.

It is to be understood that the compensator circuit of the present invention may be used with other types of coupling circuit, such, for example, as the type of coupling circuit shown in the Evjen patent above mentioned or in Evjen Patent 2,314,873, dated Mar. 30, 1943.

In the embodiment shown in Fig. 3, the coupling circuit 22, 60 of Fig. 1 has been replaced by a direct current source of measuring potential comprising a battery 90 and resistance 91 connected across the potentiometer 38. A switch 92 is included for opening the battery circuit when measurements are not being taken. The remaining elements of Fig. 3 are similar to those of Fig. 1. It is possible to use this type of measuring circuit when the imaginary component of the picked-up potential is used for measuring purposes, because during this period the normal ground potential due to the flow of earth current through electrodes 19 and 25 is reduced to a very small value and any variations therein due to changes in earth current are of such a minor nature that they do not mask the anomalous variations which are to be measured. The imaginary component of the normal potential is so small that the absolute value of the changes due to changes in earth current is much less than the anomalous changes. The compensator circuit 24, 70 is required, however, in order to compensate for the normal change with frequency of the imaginary component.

In normal operation, the potentiometer 71 is adjusted in the manner described in connection with Fig. 1 and the readings at various frequencies are taken by adjustment of the potentiometer 38. It is to be understood, however that in certain instances this procedure may be reversed and the potentiometer 38 may remain fixed while the readings are taken by adjustment of potentiometer 72, or the measuring potential introduced by the potentiometer 38 may be omitted entirely and the readings taken by adjustment of the potentiometer 72.

If it is desired to compensate for the normal variations with frequency mathematically while plotting the chart, the compensator circuit of Fig. 3 may be omitted and measurements taken with the battery 90 and potentiometer 38. Such measurements may be satisfactory in instances where the anomalous changes are of sufficient magnitude to be readily observable without compensation.

Although certain specific embodiments of the invention have been shown for purposes of illustration, it is to be understood that the invention is not to be restricted thereto but that various changes and modifications may be made therein as will be readily apparent to a person skilled in the art. The invention is to be limited only in accordance with the scope of the following claims.

What is claimed is:

1. A system for electrical prospecting, comprising an earth current circuit including a source of direct current, a pair of spaced earth electrodes and a reversing switch connected between said source and said electrodes for reversing the earth current at a plurality of different predetermined controlled frequencies, a potential circuit including potential pick-up electrodes located at spaced points lying within the field of influence of said earth current, an indicating device responsive to unidirectional potential connected to indicate the potential impressed on said potential circuit, and a reversing switch synchronized with said first reversing switch and connected in said potential circuit between said pick-up electrodes and said indicating device for converting the picked-up potential into a unidirectional potential suited to actuate said indicating device, a source of potential connected to introduce into said potential circuit a measuring potential opposing said picked-up potential, means for adjusting said measuring potential to obtain a null balance on said indicating device, and a compensating circuit interconnecting said earth current circuit and said potential circuit, said compensating circuit having an input side connected to be energized by current flow in said earth current circuit on the earth electrode side of said first reversing switch and including a filter network having an output side connected in said potential circuit, said filter network having characteristics such that its output potential varies with frequency in a manner to compensate for variations in picked-up potential due to normal changes of the earth current circuit with frequency and being so arranged that the readings of the adjustments of said adjusting means obtained at different earth current frequencies approximate a horizontal curve with ripples designating significant variations in the earth's strata.

2. A system as set forth in claim 1 in which said filter network comprises a double T filter having a pair of T branches connected in parallel, each branch having series resistances and a shunt resistance and condenser and an adjustable shunt output resistance, one of said output resistances being connected in said potential circuit.

3. A system for electrical prospecting, comprising an earth current circuit including a source of direct current, a pair of spaced earth electrodes and a reversing switch connected between said source and said electrodes for reversing the earth current at a plurality of different predetermined controlled frequencies, a potential circuit including potential pick-up electrodes located at spaced points lying within the field of influence of said earth current, an indicating device responsive to uni-directional potential connected to indicate the potential impressed on said potential circuit, and a reversing switch synchronized with said first reversing switch and connected in said potential circuit between said pick-up electrodes and said indicating device for converting the picked-up potential into a uni-directional potential suited to actuate said indicating device, a coupling circuit having an input side connected to be energized by current flow in said earth current circuit on the earth electrode side of said first reversing switch and an output side including a potentiometer connected to carry the output current, said potentiometer being connected in said potential circuit on the pick-up electrode side of said second reversing switch to impress on said potential circuit a potential drop opposing the picked-up potential and which is directly proportional to the current flowing in said earth current circuit, means for adjusting said potentiometer to obtain a null balance on said indicating device, said coupling circuit including a filter network having characteristics such that the current supplied to said potentiometer bears a substantially constant relationship to the earth current regardless of variations in frequency of said earth current within the selected range, and a compensating circuit interconnecting said earth current circuit and said potential circuit, said compensating circuit having an input side connected to be energized by current flow in said earth current circuit on the earth electrode side of said first reversing switch and including a filter network having an output side connected in said potential circuit, said filter network having characteristics such that its output potential varies with frequency in a manner to compensate for variations in picked-up potential due to normal changes of the earth current circuit with frequency and being so arranged that the readings of the adjustments of said potentiometer obtained at different earth current frequencies approximate a horizontal curve with ripples designating significant variations in the earth's strata.

4. A system for electrical prospecting as set forth in claim 1 in which the input side of said compensating circuit comprises an air core transformer responsive to low frequencies of the order of one-half cycle per second.

5. A system for electrical prospecting as set forth in claim 3 in which the input side of the coupling circuit and of the compensating circuit each comprises an air core transformer responsive to low frequencies of the order of one-half cycle per second.

6. The method of electrical prospecting which comprises passing through the earth an input current in the form of a series of similar pulses, successive pulses being in opposite directions and being spaced by a gap period during which no current flows, said gap periods and said pulse periods together forming a repeated pattern of controlled frequency, picking up the potential between spaced points within the field of influence of said input current during the current gap periods, separating the component of said picked-up potential due to the input current from other components, deriving from the input current a measuring potential having a predetermined relationship with the input current, and electrically comparing said first component with said measuring potential.

7. A system for electrical prospecting comprising an earth current circuit including spaced earth current electrodes, means supplying to said electrodes for passage through the earth a current in the form of a series of similar pulses, successive pulses being in opposite directions and being spaced by a gap period during which no current flows, said gap periods and said pulse periods together forming a repeated pattern of controlled frequency, probe electrodes in the earth within the field of influence of said earth current, a potential measuring circuit connected to said probe electrodes, a reversing switch timed to close said measuring circuit only during current gap periods and to convert the picked-up potential into a unidirectional potential, a coupling circuit connected to said earth current circuit having means responsive to the current flowing therein to develop a measuring potential having a predetermined relationship with said earth current, connections applying said measuring potential to said potential measuring circuit, and a D. C. potential measuring instrument connected in said measuring circuit to compare said measuring potential with said unidirectional potential derived from said probe electrodes.

HAAKON M. EVJEN.